(12) United States Patent
Fang et al.

(10) Patent No.: US 9,226,228 B2
(45) Date of Patent: Dec. 29, 2015

(54) METHOD FOR IMPLEMENTING POWER SAVING OF ACCESS POINT AND ACCESS POINT ON WIRELESS COMMUNICATION NETWORK

(71) Applicant: Huawei Device Co., Ltd., Shenzhen (CN)

(72) Inventors: Ping Fang, Shenzhen (CN); Zhiming Ding, Shenzhen (CN); Guiming Shu, Shenzhen (CN)

(73) Assignee: Huawei Device Co., Ltd., Shenzhen (CN)

( * ) Notice: Subject to any disclaimer, the term of this patent is extended or adjusted under 35 U.S.C. 154(b) by 167 days.

(21) Appl. No.: 13/728,673

(22) Filed: Dec. 27, 2012

(65) Prior Publication Data

US 2013/0114488 A1    May 9, 2013

Related U.S. Application Data

(63) Continuation of application No. PCT/CN2012/077489, filed on Jun. 26, 2012.

(30) Foreign Application Priority Data

Aug. 16, 2011   (CN) .......................... 2011 1 0234734

(51) Int. Cl.
*H04W 52/02*   (2009.01)

(52) U.S. Cl.
CPC ............ *H04W 52/0206* (2013.01); *Y02B 60/50* (2013.01)

(58) Field of Classification Search
CPC ...................... H04W 52/0206; Y02B 60/50
USPC .................................................. 370/311, 338
See application file for complete search history.

(56) References Cited

U.S. PATENT DOCUMENTS

| | | | | |
|---|---|---|---|---|
| 7,965,681 | B2 * | 6/2011 | Berglund et al. | 370/329 |
| 8,611,268 | B1 * | 12/2013 | Thandaveswaran | 370/311 |
| 2005/0003794 | A1 * | 1/2005 | Liu | 455/355 |
| 2005/0243781 | A1 * | 11/2005 | Vesuna et al. | 370/338 |

(Continued)

FOREIGN PATENT DOCUMENTS

| | | |
|---|---|---|
| CN | 101064894 A | 10/2007 |
| CN | 102006653 A | 11/2007 |

(Continued)

OTHER PUBLICATIONS

International Search Report issued in corresponding PCT Patent Application No. PCT/CN2012/077489, mailed Oct. 18, 2012.

*Primary Examiner* — Jianye Wu
(74) *Attorney, Agent, or Firm* — Brinks Gilson & Lione

(57) ABSTRACT

A method for implementing power saving of an access point on a wireless communication network includes: when detecting that no mobile terminal is associated, switching, by the access point, from a normal working mode to a power saving working mode; and periodically broadcasting, by the access point, a simplified beacon frame in the power saving working mode, where the simplified frame includes only a service set identity. An embodiment of the present invention further provides an access point on a wireless communication network. The access point broadcasts the simplified beacon frame in the power saving working mode. Therefore, the length of the beacon frame is shortened, thereby shortening the sending time to achieve the objective of reducing power consumption.

18 Claims, 4 Drawing Sheets

(56) References Cited

U.S. PATENT DOCUMENTS

| | | |
|---|---|---|
| 2006/0120314 A1* | 6/2006 | Krantz et al. ............... 370/311 |
| 2006/0146769 A1* | 7/2006 | Patel et al. ................. 370/338 |
| 2007/0086399 A1* | 4/2007 | Akiyama .................... 370/338 |
| 2009/0034443 A1 | 2/2009 | Walker et al. |
| 2010/0284316 A1* | 11/2010 | Sampathkumar ............ 370/311 |

FOREIGN PATENT DOCUMENTS

| | | |
|---|---|---|
| CN | 101868009 A | 10/2010 |
| CN | 102104938 A | 6/2011 |
| JP | 2007214842 A | 8/2007 |
| WO | WO 2010006142 A1 | 1/2010 |

* cited by examiner

METHOD FOR IMPLEMENTING POWER SAVING OF ACCESS POINT AND ACCESS POINT ON WIRELESS COMMUNICATION NETWORK

CROSS-REFERENCE TO RELATED APPLICATIONS

This application is a continuation of International Application No. PCT/CN2012/077489, filed on Jun. 26, 2012, which claims priority to Chinese Patent Application No. 201110234734.2, filed on Aug. 16, 2011, both of which are hereby reference in their entireties.

FIELD OF THE INVENTION

The present invention relates to the field of wireless communication technologies, and in particular to a method for implementing power saving of an access point and the access point on a wireless communication network.

BACKGROUND OF THE INVENTION

As a short-distance wireless communication technology, Wi-Fi (Wireless Fidelity, wireless fidelity) technology features advantages, such as convenient usage and high transmission speed, and is widely used in construction of a wireless local area network, access to a wide area network, and the like.

How to implement power saving in a communication system has become a problem that increasingly attracts attention in the industry. However, there is no power saving solution for an AP (Access Point, access point) on a Wi-Fi network at present. Therefore, power consumption of the AP is relatively high in the prior art.

SUMMARY OF THE INVENTION

Embodiments of the present invention provide a method for implementing power saving of an access point and the access point on a wireless communication network, and thereby resolving the problem of relatively high power consumption of the access point.

The objective of the present invention is achieved by using the following technical solutions:

A method for implementing power saving of an access point on a wireless communication network includes:

switching, by the access point, from a normal working mode to a power saving working mode after detecting that no mobile terminal is associated; and periodically broadcasting, by the access point, a simplified beacon frame in the power saving working mode, where the simplified beacon frame includes only a service set identity.

An access point on a wireless communication network includes:

a working mode switchover module, configured to switch the working mode of the access point from a normal working mode to a power saving working mode, when it is detected that no mobile terminal is associated to the access point; and an information broadcast module, configured to periodically broadcast a simplified beacon frame in the power saving working mode, where the simplified beacon frame includes only a service set identity.

It can be seen from the technical solutions provided in the embodiments of the present invention that, in the embodiments of the present invention, the access point broadcasts a simplified beacon frame in the power saving working mode. Therefore, the length of the beacon frame is shortened, thereby shortening the sending time to achieve the objective of reducing power consumption.

BRIEF DESCRIPTION OF THE DRAWINGS

To illustrate the technical solutions in the embodiments of the present invention more clearly, the following briefly describes the accompanying drawings for describing the embodiments. Apparently, the accompanying drawings in the following description merely show some embodiments of the present invention, and persons of ordinary skill in the art can derive other drawings from these accompanying drawings without creative efforts.

DETAILED DESCRIPTION OF THE EMBODIMENTS

The following clearly and completely describes the technical solutions according to the embodiments of the present invention with reference to the accompanying drawings in the embodiments of the present invention. Apparently, the embodiments in the following description are merely a part rather than all of the embodiments of the present invention. All other embodiments obtained by persons of ordinary skill in the art based on the embodiments of the present invention without creative efforts shall fall within the protection scope of the present invention.

Figure 1:
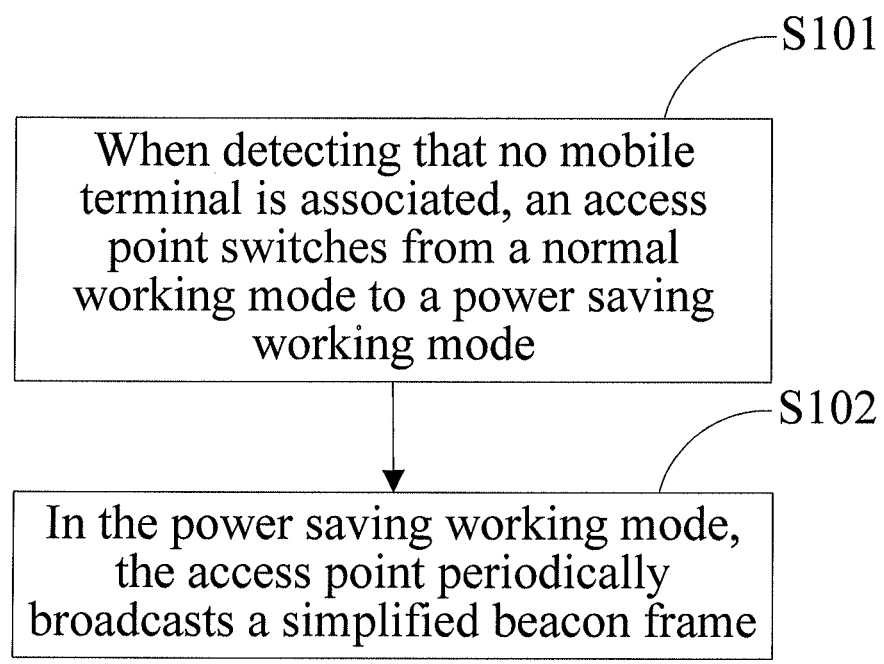
FIG. 1 is a flow chart of a method according to an embodiment of the present invention.

An embodiment of the present invention provides a method for implementing power saving of an access point on a wireless communication network. As shown in FIG. 1, its implementation manner specifically includes the following operations:

S101. When detecting that no mobile terminal is associated, the access point switches from a normal working mode to a power saving working mode.

S102. The access point periodically broadcasts a simplified Beacon (beacon) frame in the power saving working mode, where the simplified Beacon frame includes only an SSID (Service Set Identity, service set identity).

According to the method provided in the embodiment of the present invention, the access point broadcasts a simplified beacon frame in the power saving working mode. Therefore, the length of the beacon frame is shortened, thereby shortening the sending time to achieve the objective of reducing power consumption.

In the embodiment of the present invention, when the access point receives an access request message in the power saving working mode, perform S103 if the access request message is a probe request message for the access point; or perform S104 if the access request message is a connection request message.

S103. The access point returns a probe response message to a mobile terminal that sends the probe request message and continues working in the power saving working mode. The specific implementation manner may be as follows: The access point waits for a connection request message after responding to the probe request message; if receiving a connection request message within a counting time, the access point enters the normal working mode; if receiving no connection request message within the counting time, the access point continues working in the power saving working mode.

S104. The access point enters the normal working mode.

The method provided in the embodiment of the present invention implements power saving of the access point and further ensures that the access point is capable of responding to the access request of the mobile terminal in time.

The access point may further receive the broadcast probe request message, and the mobile terminal that sends the broadcast probe request message may not send the subsequent connection request message to the access point. Therefore, to avoid frequent working mode switchover and further implement power saving, the access point does not respond to the received broadcast probe request message in the embodiment of the present invention.

In the embodiment of the present invention, the sending interval of a simplified Beacon frame may further be lengthened to reduce the sending frequency of a Beacon frame, thereby further reducing power consumption to implement power saving of the access point. Accordingly, in the power saving working mode, the BI (Beacon Interval, beacon frame sending interval) used by the access point for periodically broadcasting the simplified Beacon frame is longer than the BI used in the normal working mode. In the power saving working mode, the BI may increase in a gradual lengthening manner. However, the BI value cannot increase unlimitedly. It is necessary to consider the balance between the Beacon sending times reduced by increasing the BI and the time on which a network is found by a newly come STA.

To further reduce power consumption and implement power saving of the access point, after the access point broadcasts a simplified Beacon frame, in one BI, the method provided in the embodiment of the present invention may further include: waiting, by the access point, after broadcasting a simplified Beacon frame, to receive the access request message of the mobile terminal; entering a dormant state if no access request message is received within the scheduled counting time; enabling, when the BI ends, an antenna to broadcast a next simplified Beacon frame; and proceeding with S103 or S104 if the access request message is received within the scheduled time.

The access request message in the embodiment of the present invention indicates a series of messages sent by a mobile terminal in a network access process.

The method provided in the embodiment of the present invention is applied on a wireless communication network, and especially may be applied on a Wi-Fi network.

The following details a specific implementation manner in the actual application process of the embodiment of the present invention.

Figure 2:
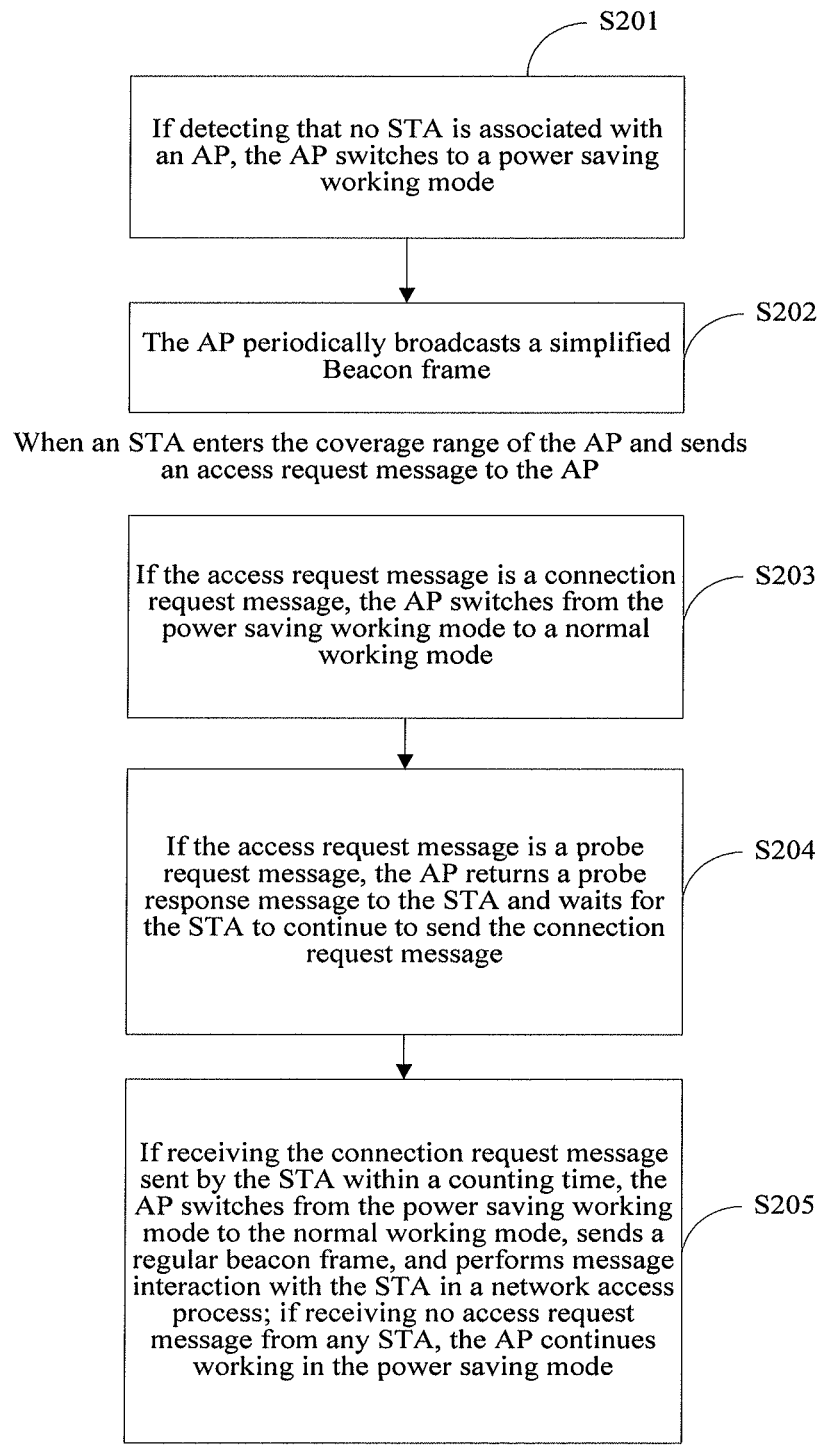
FIG. 2 is a flow chart of a method according to an application embodiment of the present invention.

By taking the Wi-Fi network as an example, in one application embodiment of the present invention, a method for implementing power saving of an access point is shown in FIG. 2. The following operations are specifically included:

The access point (AP for short) on the Wi-Fi network works in a normal working mode.

S201. If detecting that no mobile terminal (STA for short) is associated with the AP, the AP switches to a power saving working mode.

Specifically, the AP may switch to the power saving working mode if not detecting an STA in a continuous period of time.

S202. The AP periodically broadcasts a simplified Beacon frame, where the simplified Beacon frame includes only an SSID.

Compared with an existing Beacon frame, mandatory content such as Timestamp (timestamp), BI (beacon frame sending interval), and Supported Rate (supported rate), and optional parameters such as the FH (frequency hopping) parameter, the DS (distributed system) parameter, the CF (contention free) parameter, and the IBSS (independent basic service set) parameter, are stripped from the simplified Beacon frame. Therefore, the length of a Beacon frame is greatly shortened, thereby shortening the sending time and reducing power consumption of the AP to implement power saving.

In addition, the BI for the AP to broadcast the simplified Beacon frame may be longer than the BI for broadcasting the Beacon frame in the normal working mode. Power consumption is further reduced by reducing the sending frequency of the Beacon frame to implement power saving.

When an STA enters the coverage range of the AP and sends an access request message to the AP, if the access request message is a connection request message, perform S203 where the AP switches from the power saving working mode to the normal working mode, where the access request message may be but is not limited to: an Authentication (authentication) message, an Association (association) message, or a Reassociation (reassociation) message; or if the access request message is a Probe Request (probe request) message, perform S204 where the AP returns a Probe Response (probe response) message to the STA and waits for the STA to continue to send the connection request message, and perform S205.

S205. If receiving the connection request message sent by the STA within a counting time, the AP switches from the power saving working mode to the normal working mode, sends a regular Beacon frame, and performs message interaction with the STA in a network access process; if receiving no access request message from any STA within the counting time, the AP continues working in the power saving working mode.

Figure 3:
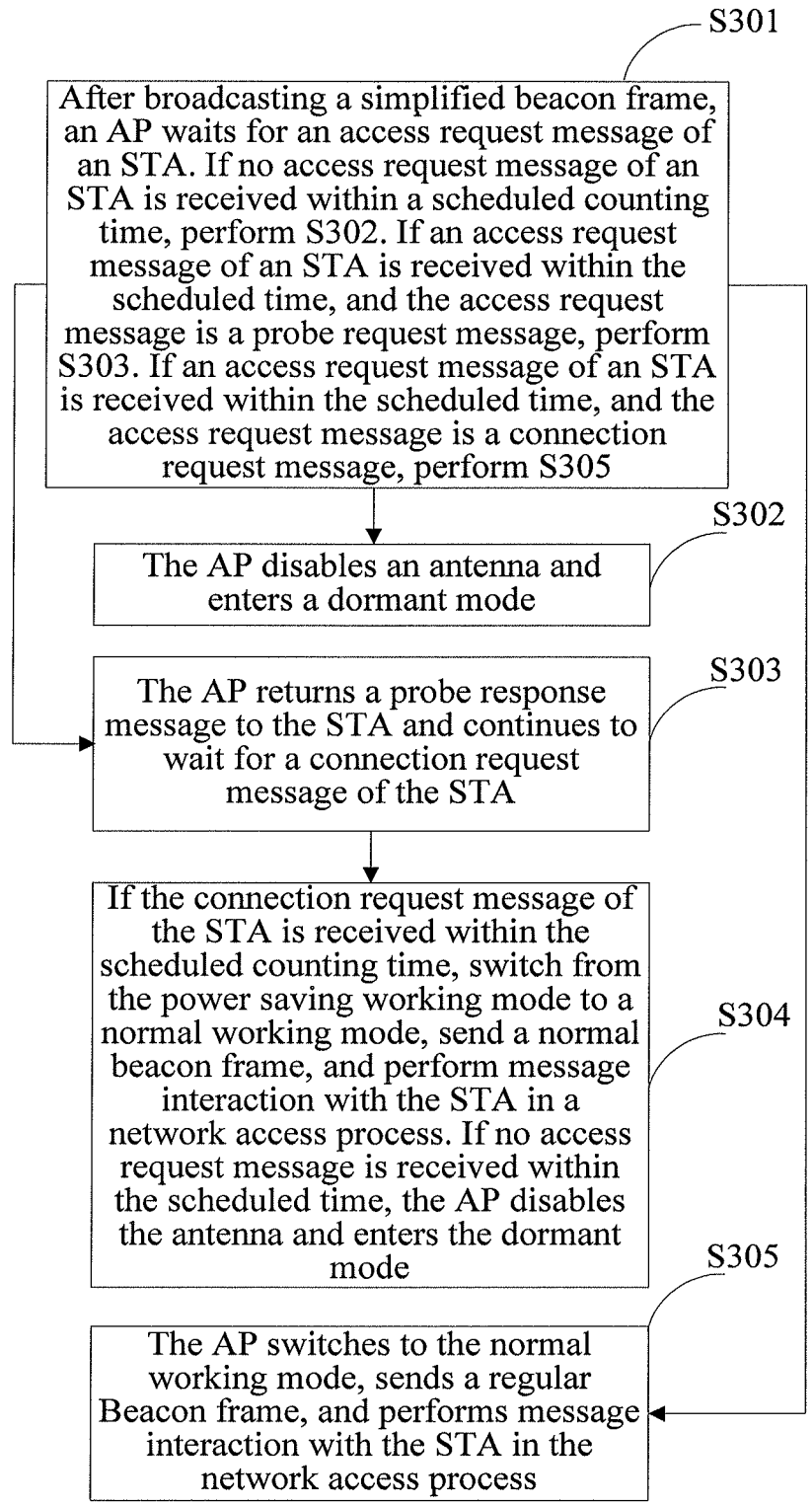
FIG. 3 is a flow chart of a method according to another application embodiment of the present invention.

In another application embodiment of the present invention, an AP may further enter a dormant mode in the BI between broadcasting two Beacon frames to further reduce power consumption and implement power saving. As shown in FIG. 3, its implementation manner specifically includes the following operations:

The AP on a Wi-Fi network works in a power saving working mode and periodically broadcasts a simplified Beacon frame, where the simplified Beacon frame includes only an SSID. The BI for the AP to broadcast the simplified Beacon frame may be longer than the BI for broadcasting a Beacon frame in a normal working mode.

S301. After broadcasting a simplified Beacon frame, the AP waits to receive an access request message of an STA, such as a Probe Request message, an Authentication message, an Association message, or a Reassociation message.

If no access request message of any STA is received within a scheduled counting time, perform S302 where the AP disables an antenna and enters the dormant mode.

If an access request message of an STA is received within the scheduled time and the access request message is a Probe Request message, perform S303 where the AP returns a Probe Response message to the STA and continues to wait for a connection request message of the STA, and perform S304.

S304. If the connection request message of the STA is received within the scheduled counting time, switch from the power saving working mode to the normal working mode, send a regular Beacon frame, and perform message interaction with the STA in a network access process; if no access request message is received within the scheduled time, the AP disables the antenna and enters the dormant mode.

If an access request message of an STA is received within the scheduled time and the access request message is a connection request message, perform S305 where the AP switches to the normal working mode, sends a regular Beacon frame, and performs message interaction with the STA in a network access process.

The dormant mode of the AP ends when a BI ends. The AP wakes up, continues to broadcast a next simplified Beacon frame, and repeats S301.

All or a part of steps of the methods in the embodiments may be implemented by a program instructing related hardware. The program may be stored in a computer readable medium. When the program is run, the processes of the methods in the embodiments are performed. The storage medium includes any medium that can store program codes, such as a ROM, a RAM, a magnetic disk, or an optical disk.

Figure 4:
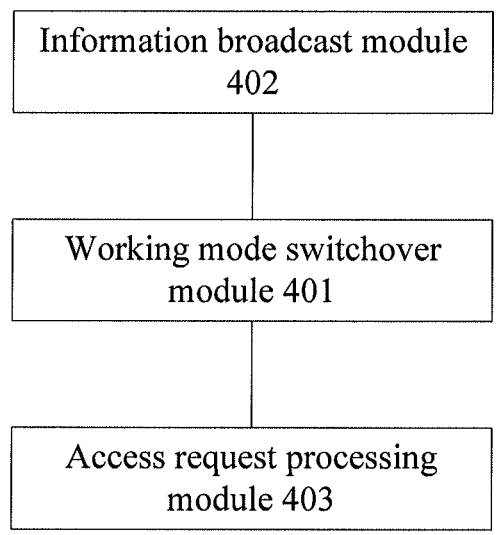
FIG. 4 is a schematic structural diagram of an access point according to an embodiment of the present invention.

An embodiment of the preset invention further provides an access point on a wireless communication network. As shown in FIG. 4, the specific implementation structure includes:

a working mode switchover module 401, configured to switch the working mode of the access point from a normal working mode to a power saving working mode, when it is detected that no mobile terminal is associated to the access point; and an information broadcast module 402, configured to periodically broadcast a simplified beacon frame in the power saving working mode, where the simplified beacon frame includes only a service set identity.

The access point provided in the embodiment of the presentation broadcasts a simplified beacon frame in the power saving working mode. Therefore, the length of the beacon frame is shortened, thereby shortening the sending time to achieve the objective of reducing power consumption.

The access point provided in the embodiment of the presentation further includes an access request processing module 403, configured to receive an access request message in the power saving working mode.

If the access request message is a probe request message for the access point, the access request processing module 403 is further configured to return a probe response message to a mobile terminal that sends the probe request message and enable the access point to continue working in the power saving working mode. Specifically, after responding to the probe request message, a connection request message is waited for. If a connection request message is received within a counting time, the working mode switchover module 401 is triggered to switch the working mode of the access point to the normal working mode; if no connection request message is received, the working mode switchover module 401 is not triggered, so that the access point continues working in the power saving working mode.

If the access request message is a connection request message, the access request processing module 403 is further configured to trigger the working mode switchover module 401 to switch the working mode of the access point to the normal working mode.

The access point provided in the embodiment of the presentation implements power saving and further ensures that the access request of the mobile terminal is responded in time.

The access point provided in the embodiment of the presentation may further lengthen the sending interval of a simplified Beacon frame to lower the sending frequency of the Beacon frame, thereby further reducing power consumption. Accordingly, in the power saving working mode, the beacon frame sending interval used by the information broadcast module 402 for periodically broadcasting the simplified beacon frame is longer than the beacon frame sending interval used in the normal working mode. In the power saving working mode working mode, the BI may increase in a gradual lengthening manner. However, the BI value cannot increase unlimitedly. It is necessary to consider the balance between the Beacon sending times reduced by increasing the BI and the time on which a network is found by a newly come STA.

To further reduce power consumption, in the access point provided in the embodiment of the presentation, after the information broadcast module 402 broadcasts a simplified Beacon frame, in one BI, the working mode switchover module 401 is further configured to: if no access request message of the mobile terminal is received within the counting time, disable an antenna and enable the AP enter the dormant state.

As an example but not a limitation, the access point provided in the embodiment of the presentation is specifically an access point on a Wi-Fi network.

The foregoing descriptions are merely preferred exemplary embodiments of the present invention, but not intended to limit the protection scope of the present invention. Any variation or replacement that can be easily made by persons skilled in the art without departing from the technical scope disclosed by the present invention shall fall within the protection scope of the present invention. Therefore, the protection scope of the present invention shall be subject to the protection scope of the claims.

What is claimed is:

1. A method for implementing power saving of an access point on a wireless communication network, comprising:
    switching, by the access point, from a normal working mode to a power saving working mode after detecting that no mobile terminal is associated; and
    reducing the access point's transmission power by: periodically broadcasting in the power saving working mode, a simplified beacon frame which consists of only a service set identity.

2. The method according to claim 1, further comprising:
    when the access point receives an access request message in the power saving working mode,
    if the access request message is a probe request message for the access point, returning, by the access point, a probe response message to a mobile terminal that sends the probe request message, and continuing working in the power saving working mode;
    if the access request message is a connection request message, entering, by the access point, to the normal working mode.

3. The method according to claim 1, wherein in the power saving working mode, a beacon frame sending interval used by the access point for periodically broadcasting the simplified beacon frame is longer than the beacon frame sending interval used in the normal working mode.

4. The method according to claim 2, wherein in the power saving working mode, a beacon frame sending interval used by the access point for periodically broadcasting the simplified beacon frame is longer than the beacon frame sending interval used in the normal working mode.

5. The method according to claim 1, after the access point broadcasts a beacon frame, in a beacon frame sending interval, comprising:
    if no access request message of a mobile terminal is received within a counting time, disabling an antenna and entering a dormant state.

6. The method according to claim 2, after the access point broadcasts a beacon frame, in a beacon frame sending interval, comprising:

if no access request message of a mobile terminal is received within a counting time, disabling an antenna and entering a dormant state.

7. The method according to claim 3, after the access point broadcasts a beacon frame, in a beacon frame sending interval, comprising:
if no access request message of a mobile terminal is received within a counting time, disabling an antenna and entering a dormant state.

8. The method according to claim 4, after the access point broadcasts a beacon frame, in a beacon frame sending interval, comprising:
if no access request message of a mobile terminal is received within a counting time, disabling an antenna and entering a dormant state.

9. The method according to claim 1, wherein the method is applied on a Wi-Fi network.

10. An access point on a wireless communication network, comprising:
a working mode switchover module, configured to switch a working mode of the access point from a normal working mode to a power saving working mode, when it is detected that no mobile terminal is associated to the access point; and
an information broadcast module, configured to reduce the access point's transmission power by: periodically broadcast in the power saving working mode a simplified beacon frame which consists of only a service set identity.

11. The access point according to claim 10, further comprising:
an access request processing module, configured to receive an access request message in the power saving working mode, wherein
if the access request message is a probe request message for the access point, the access request processing module is further configured to: return a probe response message to a mobile terminal that sends the probe request message and continue working in the power saving working mode;
if the access request message is a connection request message, the access request processing module is further configured to: trigger the working mode switchover module to switch the working mode of the access point to the normal working mode.

12. The access point according to claim 10, wherein in the power saving working mode, the beacon frame sending interval used by the information broadcast module for periodically broadcasting the simplified beacon frame is longer than the beacon frame sending interval used in the normal working mode.

13. The access point according to claim 11, wherein in the power saving working mode, the beacon frame sending interval used by the information broadcast module for periodically broadcasting the simplified beacon frame is longer than the beacon frame sending interval used in the normal working mode.

14. The access point according to claim 10, wherein after the information broadcast module broadcasts a simplified beacon frame, in a beacon frame sending interval, the working mode switchover module is further configured to disable an antenna and enter a dormant state if no access request message of an mobile terminal is received within a counting time.

15. The access point according to claim 11, wherein after the information broadcast module broadcasts a simplified beacon frame, in a beacon frame sending interval, the working mode switchover module is further configured to disable an antenna and enter a dormant state if no access request message of an mobile terminal is received within a counting time.

16. The access point according to claim 12, wherein after the information broadcast module broadcasts a simplified beacon frame, in a beacon frame sending interval, the working mode switchover module is further configured to disable an antenna and enter a dormant state if no access request message of an mobile terminal is received within a counting time.

17. The access point according to claim 13, wherein after the information broadcast module broadcasts a simplified beacon frame, in a beacon frame sending interval, the working mode switchover module is further configured to disable an antenna and enter a dormant state if no access request message of an mobile terminal is received within a counting time.

18. The access point according to claim 10, wherein the wireless communication network is specifically a wireless fidelity Wi-Fi network.

* * * * *